(12) United States Patent
Gronow et al.

(10) Patent No.: US 8,832,134 B2
(45) Date of Patent: Sep. 9, 2014

(54) METHOD, SYSTEM AND CONTROLLER FOR SEARCHING A DATABASE CONTANING DATA ITEMS

(75) Inventors: Brett James Gronow, Fitzroy (AU); Keith David Deverell, Collingwood (AU); Jonathan David Pak, Fitzroy North (AU); Christopher Glendon Bates, Box Hill North (AU); David Peter Wolf, Northcote (AU)

(73) Assignee: Someones Group Intellectual Property Holdings Pty Ltd ACN (AU)

( * ) Notice: Subject to any disclaimer, the term of this patent is extended or adjusted under 35 U.S.C. 154(b) by 0 days.

(21) Appl. No.: 13/394,918

(22) PCT Filed: Sep. 10, 2010

(86) PCT No.: PCT/AU2010/001176
§ 371 (c)(1),
(2), (4) Date: Mar. 8, 2012

(87) PCT Pub. No.: WO2011/029150
PCT Pub. Date: Mar. 17, 2011

(65) Prior Publication Data
US 2012/0173559 A1      Jul. 5, 2012

(30) Foreign Application Priority Data
Sep. 11, 2009   (AU) ............................. 2009904400

(51) Int. Cl.
*G06F 17/30*   (2006.01)
(52) U.S. Cl.
CPC .............................. *G06F 17/30274* (2013.01)
USPC ....................................................... 707/766

(58) Field of Classification Search
USPC ........................................................ 707/723
See application file for complete search history.

(56) References Cited

U.S. PATENT DOCUMENTS

| | | | |
|---|---|---|---|
| 7,272,593 B1* | 9/2007 | Castelli et al. ................. | 707/600 |
| 8,352,465 B1* | 1/2013 | Jing et al. ....................... | 707/723 |
| 2002/0007373 A1 | 1/2002 | Blair et al. | |
| 2002/0083031 A1 | 6/2002 | De Varax | |
| 2004/0125150 A1* | 7/2004 | Adcock et al. ................. | 345/810 |
| 2005/0259116 A1* | 11/2005 | Araoka ......................... | 345/619 |
| 2006/0218522 A1 | 9/2006 | Hanechak | |
| 2007/0033632 A1 | 2/2007 | Baynger et al. | |
| 2007/0094241 A1 | 4/2007 | Blackwell et al. | |

OTHER PUBLICATIONS

Category-Based Image Retrieval by S. Newsam, B. Sumengen and B.S. Manjunath (hereafter Newsam), IEEE, 2001, 0-7803-6725-1/01, pp. 596-599 vol. 3.*

(Continued)

*Primary Examiner* — Robert Beausoliel, Jr.
*Assistant Examiner* — Hau H Hoang
(74) *Attorney, Agent, or Firm* — Katten Muchin Rosenman LLP

(57) ABSTRACT

A method, system and controller is provided for searching a database containing data items with a user via a user interface, the method comprising the steps of specifying an initial search subset of some or all of the data items in the database (1201); identifying representatives of each of a number of data categories in the search subset (1203); displaying the representatives on the user interface (1204); selecting one or more of the representatives (1205); specifying a refined search subset of data items in the search subset within the data categories corresponding to the selected representatives (1207); and repeating the steps of identifying and displaying representatives for the refined search subset.

22 Claims, 6 Drawing Sheets

(56) References Cited

OTHER PUBLICATIONS

Australian Patent Office, International Search Report and Written Opinion on PCT/AU2010/001176, Dec. 16, 2010, Woden Act 2606, Australia.

The Fisrt Office Action for Chinese Patent Application No. 201080050275.6 with a mailing date of Jun. 7, 2013.

Alex Aris et al., "Exploiting Location and Time for Photo Search and Storytelling in MyLifeBits," Sep. 1, 2004, retrieved from the Internet at <URL:http://research.microsoft.comjpubs/700990-2004-102.pdf> on May 14, 2014.

Deligiannidis L et al: "Event visualization in a 3D environment", Human System Interactions, 2008 Conference on, IEEE, Piscataway, NJ, USA, May 25, 2008, pp. 158-164,.

May 23, 2014 Extended European Search Report for European Patent Application No. 10807784.3.

* cited by examiner

METHOD, SYSTEM AND CONTROLLER FOR SEARCHING A DATABASE CONTANING DATA ITEMS

FIELD

The present invention relates to a computerized method, system and controller for searching a database of data items, particularly but not limited to media items such as images, music, movies, games or books.

BACKGROUND TO THE INVENTION

Searching through databases of media items such as stock photographs is a task often undertaken both in the media industry and by consumers generally. Websites such as gettyimages.com images.google.com and others typically provide searching methods that involve descriptor based indexing of image content. The content descriptors typically relate to aspects such as concept, emotion, location or to the characteristics of people in the image. The user specifies values of one or more content descriptors typically using checkboxes in drop-down lists and the image search engine then searches the image database index for images matching the user-specified values. Matching images are then typically displayed, accompanied with technical information such as resolution or origin, in a scrollable window. Usually a first page shows the closest matches, which may involve some assessment of additional native properties such as colour balance, and multiple further pages contain less close matches. The user inspects the many images and may refine the search by specifying further content descriptor values, or by choosing one reference image as an example.

Although an initial search using descriptors produces many potentially relevant images, refinement of the search to select out images of more interest is often frustrating.

Further, the need to scroll through and individually examine a mixture of a large number of images and text is tiring and tedious.

There is therefore a need to provide improved database searching techniques that enable more efficient and user-friendly identification of useful data items.

The inventors of the current invention have found a much improved method of assisting the user to locate a data item of interest, by making advances in the use of selection and display of representative data items.

SUMMARY OF THE INVENTION

According to a first aspect of the invention there is provided a method of searching a database containing data items with a user via a user interface, comprising the steps of
  specifying an initial search subset of some or all of the data items in the database;
  identifying representatives of each of a number of data categories in the search subset;
  displaying the representatives on the user interface;
  selecting one or more of the representatives;
  specifying a refined search subset of data items in the search subset within the data categories corresponding to the selected representatives; and
  repeating the steps of identifying and displaying representatives for the refined search subset.

In one embodiment, the step of specifying an initial search subset comprises receiving a restriction criterion from the user and defining the initial subset as data items satisfying the restriction criterion. The restriction criterion may be a value of a search term.

In one embodiment, the data items are associated with descriptor values in a multidimensional descriptor space and the data categories in the search subset are sectors in the descriptor space. The multidimensional descriptor space may be defined having regard to obtaining categories adapted to the specified search subset, such as from a descriptor table of stored values in a descriptor space of larger dimensionality by an algorithm that identifies a set of appropriate descriptors with reduced dimensionality for the search subset. The reduced dimensionality is chosen having regard to the number of categories.

In an embodiment, an origin of the descriptor space is near a centre of the search subset so that the descriptor coordinates of the search subset have positive and negative values; and
  at least one of the categories is a sector in the multidimensional descriptor space that is greater in a positive or negative direction in one dimension compared to the other dimensions.

In one embodiment, the number of categories is chosen so that all the representatives can be displayed to the user at once. The step of displaying the representatives of the refined search set may comprise displaying the representatives of the refined search subset next to the representatives of the initial search subset.

In one embodiment, the process of specifying, identifying, displaying and selecting is adapted to repeat until all the categories have no more than one member.

In one embodiment, the data items comprise digital media.

According to a second aspect of the invention there is provided a database searching system for interactively searching a database containing data items with a user, comprising
  a user interface with a display;
  an initial search subset specifier for specifying an initial search subset of some or all of the data items in the database;
  a representative identifier for identifying representatives of each of a number of data categories in the search subset;
  a representative display controller for displaying the representatives on the display;
  a representative selector for selecting one or more of the representatives;
  a refined search subset specifier for specifying a refined search subset of data items in the search subset within the data categories corresponding to the selected representatives;
  a repeater for repeating the steps of identifying and displaying representatives for the refined search subset.

According to a third aspect of the invention there is provided a database searching controller for interactively searching a database containing data items with a user via a user interface having a display, comprising
  an initial search subset specifier for specifying an initial search subset of some or all of the data items in the database;
  a representative identifier for identifying representatives of each of a number of data categories in the search subset;
  a representative display controller for displaying the representatives on the display;
  a representative selector for selecting one or more of the representatives;

a refined search subset specifier for specifying a refined search subset of data items in the search subset within the data categories corresponding to the selected representatives;

a repeater for repeating the steps of identifying and displaying representatives for the refined search subset.

According to a fifth aspect of the invention there is provided a computer readable medium comprising the program code of the fourth aspect of the invention.

According to a sixth aspect of the invention there is provided a data signal comprising the computer program code of the fourth aspect of the invention.

DETAILED DESCRIPTION OF EMBODIMENTS

Figure 1:
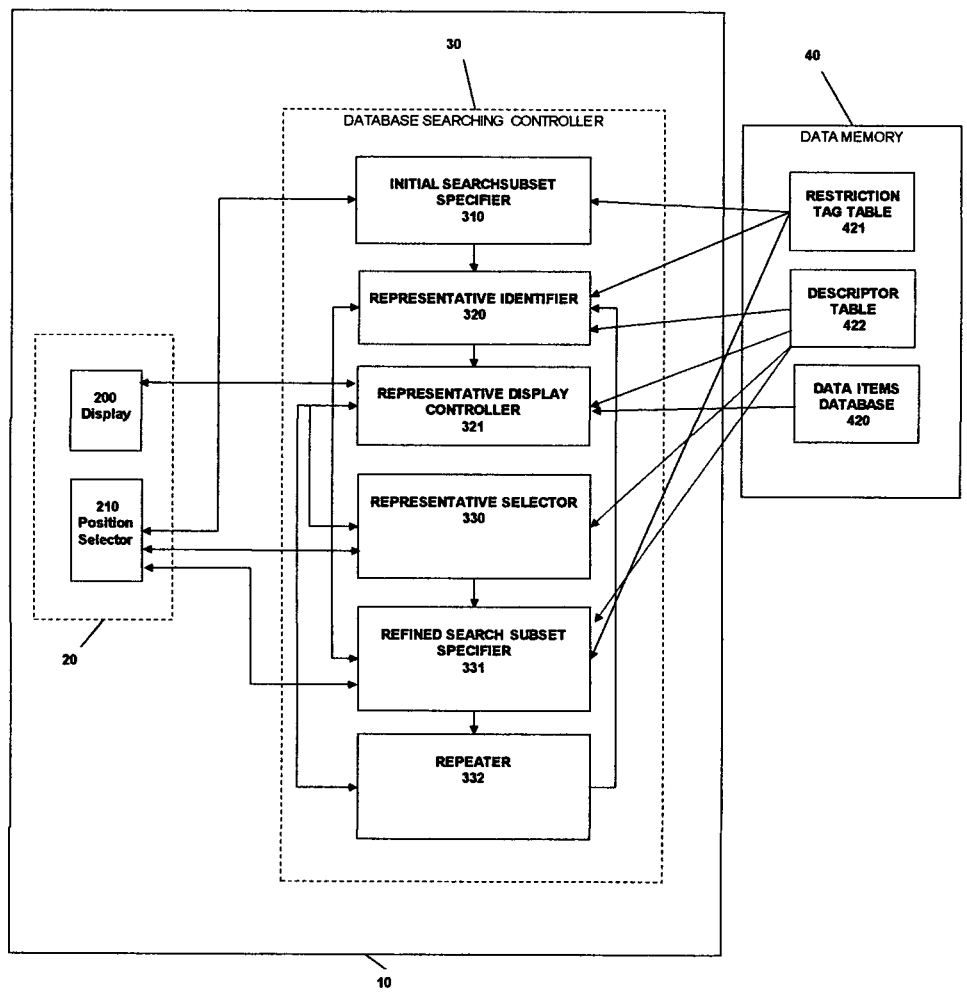
FIG. 1 is a block diagram of an example database searching system of the current invention.

Referring to the drawings, there is shown various aspects of a database searching system, controller and method according to an embodiment of the invention.

The system may take a number of different forms. In a first form, a standalone system is provided wherein all or most components required are present in a local user operable computer and interface.

In a second form, a distributed architecture is provided wherein some of the components required for implementing the system are present in local user operable computer and interface and some of the components are located remotely relative to the user. For example, a "thick client" architecture may be used wherein part of the search and/or display control is executed on a local user operable computer and interface and part is executed remotely, such as by a server; or a "thin client" architecture may be used wherein most of the search and display control is executed remotely such as by a server and a local machine is used only for the user interface.

A typical web-based implementation involves a conventional personal computer with display, keyboard and mouse or touch sensitive screen, implementing the database searching controller as a JavaScript or XML program which may be downloaded from a website. The database will typically be stored remotely from the user and be interrogated by the database searching controller.

Referring now to FIG. 1, the core components at the broadest level are the database searching system 10 comprising a user interface 20 and an database searching controller 30, communicating with a data memory 40 which may be located both locally and remotely. In one embodiment data memory 40 includes a data items database 420, descriptor table 422 and restriction tag table 421.

Components of the user interface 20 include a display 200 such as an LCD monitor and a position selector 210 such as a mouse for the user to indicate a position on the display 200 with at least one selector button such as a left or right mouse button to enable the user to select the position and perform other input functions.

The database searching controller 30 is in data communication with the user interface 20 and data memory 40 and typically contains or is implemented on a processor that processes the search in accordance with user input and outputs on display 200. Herein the term "processor" is used to refer generically to any device that can perform this function and may include: a microprocessor, microcontroller, programmable logic device or other computational device, a general purpose computer (e.g. a PC) or a server.

For media applications, data items database 420 is a large database of media data items, accompanied as is standard in the art by a restriction tag table 421 typically containing textual or binary content-based information in relation to each media item, but may also contain some native media information such as media type (e.g. colour/B&W). Data memory 40 also contains descriptor table 422 of derived descriptors for each media item as described herein which typically originate from native audiovisual descriptors but may also originate from content-based information. Tables 421 and 422 are computed during a database build and may be remotely located from media item database 420, particularly in the case where the invention is being exercised by a party other that the owner of the data items database 420. Tables 421 and 422 may be ordered or indexed in whole or part such as with a binary tree to speed identification of items in database 420 satisfying values or value ranges in the descriptors or restriction tags, as is known in the art.

Database searching controller 30 has an initial search subset specifier 310 for specifying an initial search subset typically by receiving a restriction criterion from the user via the user interface. In simple implementations, initial search subset specifier 310 may be trivially adapted only to specify the entire data items in database 420 or a fixed subset thereof. Database searching controller 30 also has a representative identifier 320 for identifying a set of representative data items in the search subset 420, each being representative of one of a number of categories in the search subset, a representative display controller 321 for displaying the representatives on display 200, and representative selector 330 for selecting one or more of the representatives, typically selected by the user via position selector 210. Also provided in database searching controller 30 is a refined search subset specifier 331 for specifying a refined search subset of data items in the search subset within the data categories corresponding to the selected representatives, and a repeater 332 for transferring the refined search subset to representative identifier 320 and for displaying the newly identified representatives via representative display controller 321.

Figure 2:
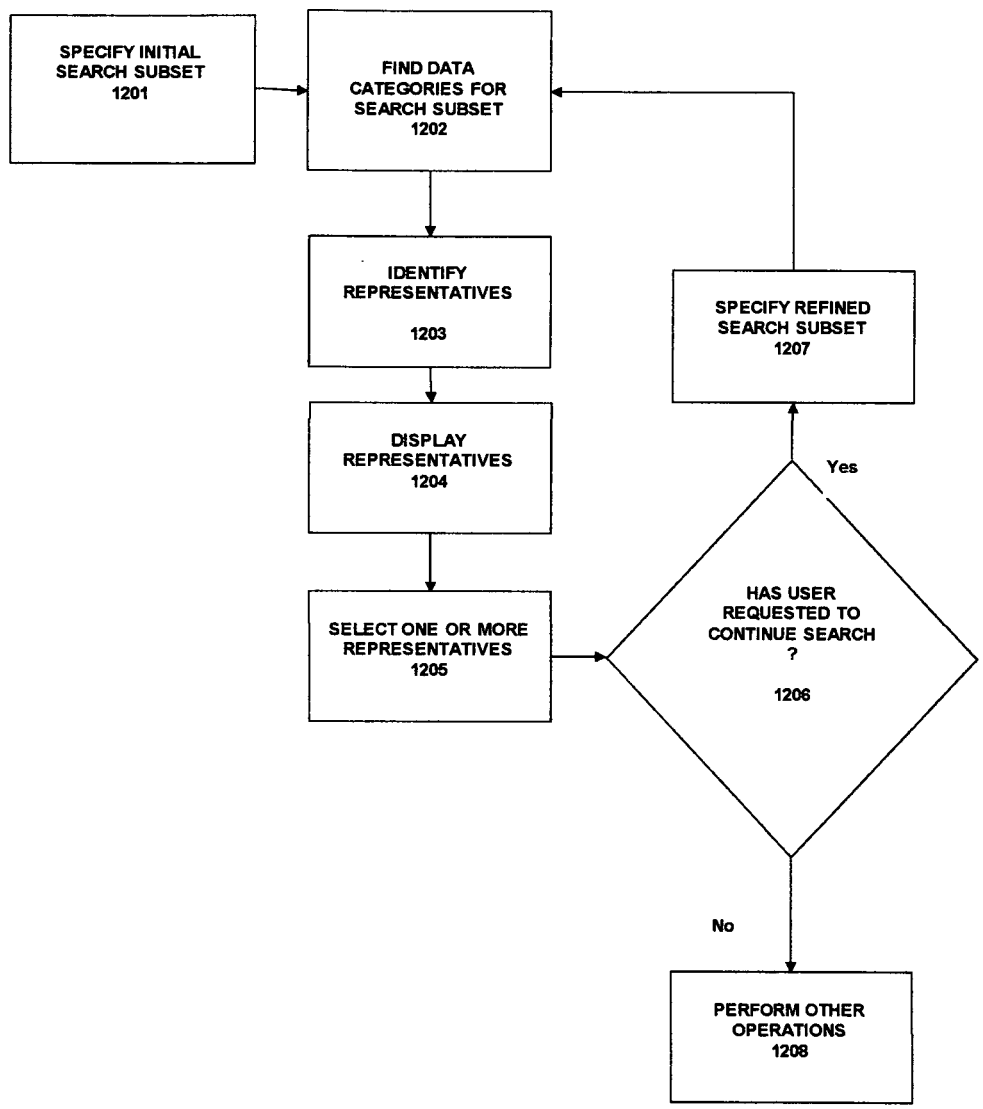
FIG. 2 shows a flow diagram for the method of database searching of an embodiment of the current invention.
Figure 3:
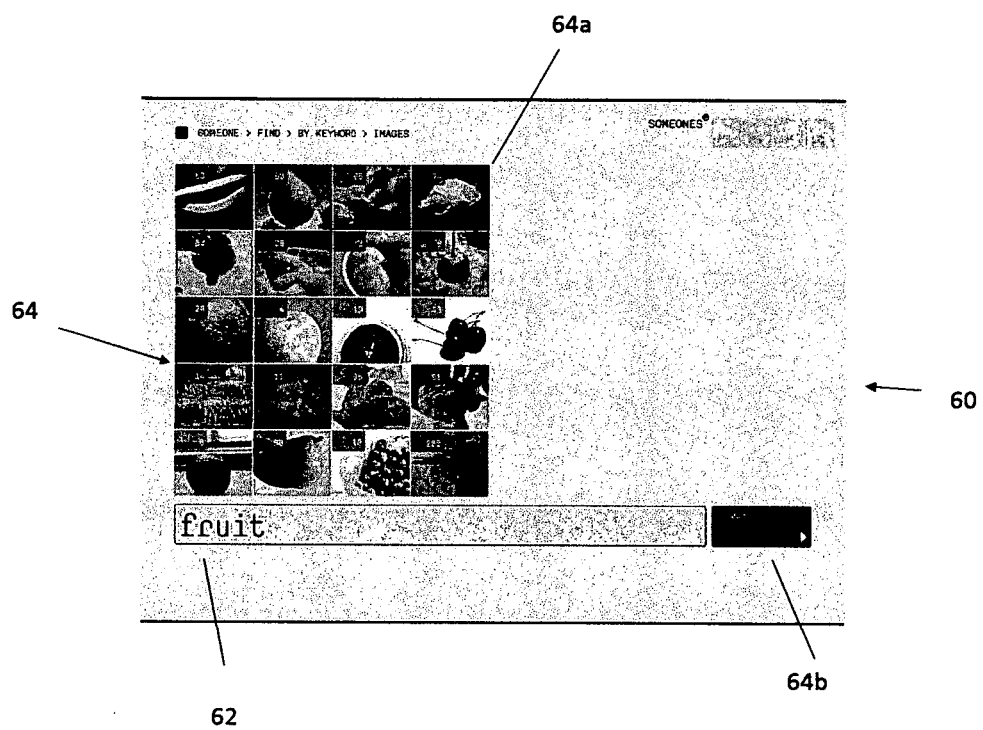
FIGS. 3-6 show displays in a search session in a database of images according to an embodiment of the current invention.
Figure 4:
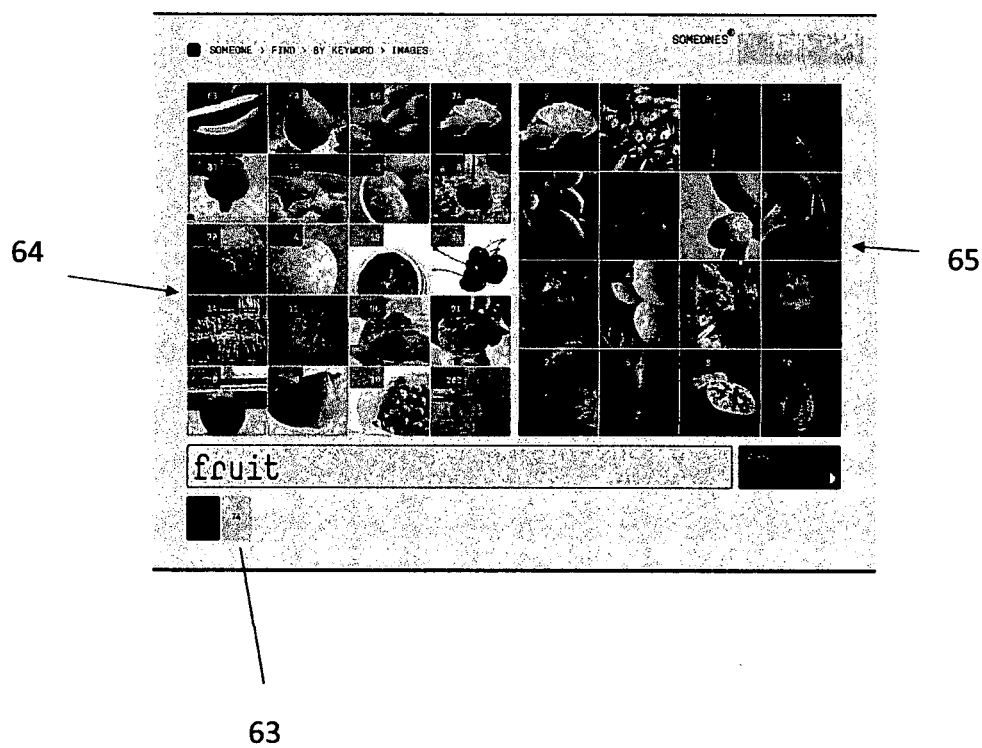
Figure 5:
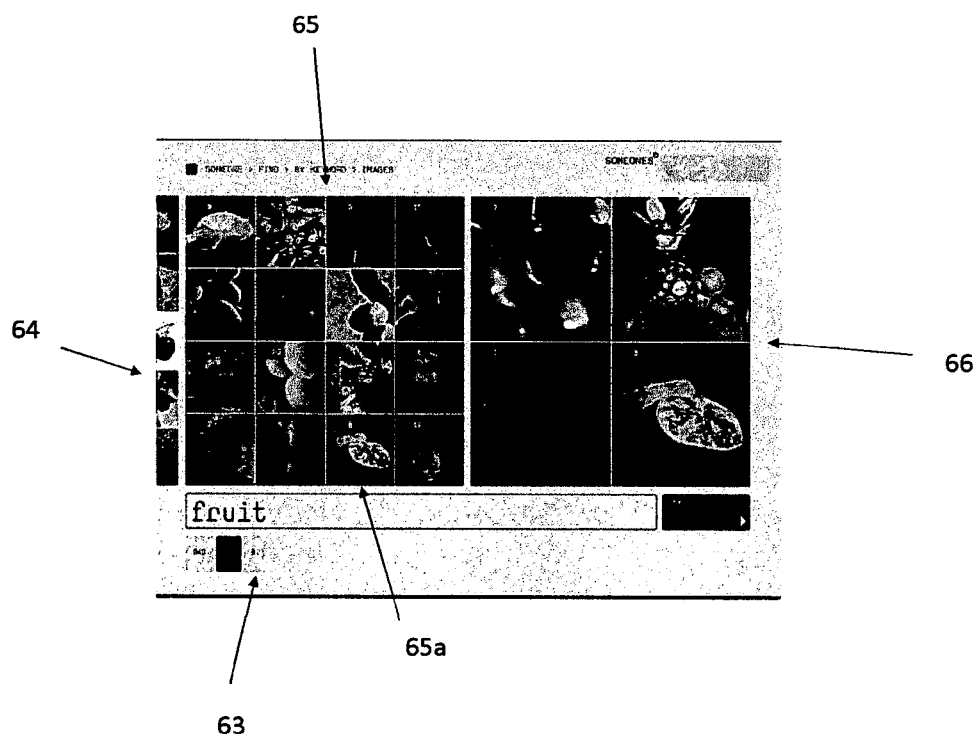
Figure 6:
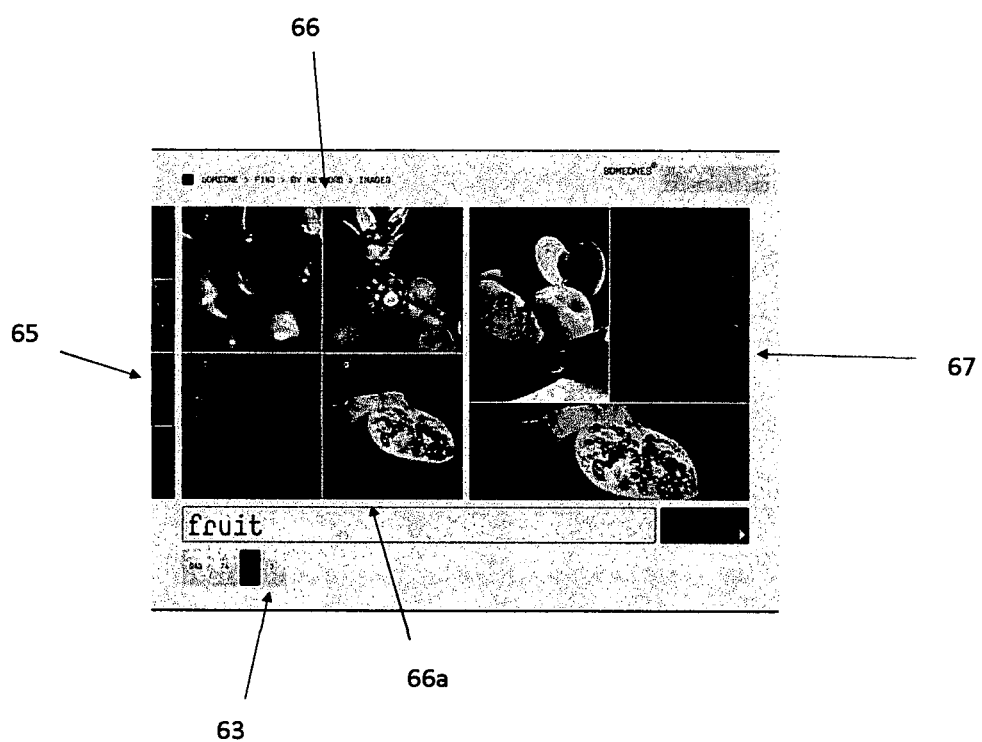

Referring now to FIGS. 2 to 6, one embodiment of the method aspect of the invention is depicted in a flow diagram in FIG. 2 and an example display layout is shown in steps of the method of the invention in FIGS. 3 to 6. In step 1201, the user specifies an initial search subset by typing a restriction criterion such as the search term "fruit" in restriction criterion window 62 and clicking on the "search" button 64b. Initial search subset specifier 310 accesses restriction tag table 421 to identify the data items satisfying the restriction criterion, in this case images containing fruit. This is the initial search subset. In step 1202, 20 data categories are found that are appropriate to the search subset, using single value decomposition to a ten-dimensional descriptor space from the 35 dimensional space represented in the descriptor table 422. Details of these processes are provided in the examples below. In step 1203 and 1204, representatives of each data category are identified and displayed, also described in more detail below. FIG. 3 shows the 20 representatives displayed is a 5 by 4 grid 64 on the left side of display 60. At the top left of each image is a number which informs the user how many of the data items in the search subset are in each corresponding data category. In step 1205, the user selects one or more of the representatives as worthy of further search, by clicking with the position selector 210 and confirming in step 1206 that the selected items are to be the selected representatives by clicking on the "search button" 64b. In the session shown in FIG. 3, the top right hand representative 64a is selected. In step 1207, a refined search subset is defined as those members of the current search subset that are contained within the data categories corresponding to the selected representatives. The system then repeats the step of finding appropriate categories by SVD from the descriptor table values for the refined search subset to a new 10-dimensional descriptor space appropriate to the refined search subset. Representatives for each of the 20 categories are then identified again and displayed on the right side 65 of the display. The top left hand representative is the same as the previously selected representative but this may not necessarily be the case. At the bottom of the screen is a "breadcrumb" trail of the search refinement. Clicking on the last box in the trail will revert the search subset back to the previous search subset. Further refined subsets are selected from representative 65a in FIG. 5 (the pomegranate) to produce four representatives of a two dimensional descriptor space) and as shown in FIG. 6 the pomegranate 66a, being a representative of a category having 3 members is selected again and the final refined search subset 67, having only 3 members, is displayed.

As the hierarchical search proceeds, the breadcrumb trail 63 extends and the series at representatives of the search subsets are added to a band which disappears to the left. The user can jump back to any search subset in the sequence by clicking on the relevant box in the breadcrumb trail, and can add further restriction to the search subsets by editing the restriction criterion window 62.

Example of Image-Based Descriptor Table.

It is contemplated that in typical embodiments of the invention, the multidimensional descriptor space appropriate to the data categories is defined from a descriptor table 422 of stored values in a descriptor space of larger dimensionality.

For application to images, there are many available image descriptors that can be used in the invention to generate the descriptor table 422. Examples include colour histogram, SIFT edge detection, SURF edge detection, Canny edge detection, Tamura texture features, and Gabor texture features.

The inventors' currently implemented embodiment for images such as photographs or movie stills uses, for the descriptor table, a set of 35 descriptors derived during a database build using single value decomposition (SVD) of the 336 descriptors in the combination of the uncompressed CEDD [Ref 1] and FTCH [Ref 2] descriptor sets.

Example of Finding Data Categories for the Search Subset

In the embodiment illustrated in FIGS. 3 to 6, representatives of 20 data categories in the initial search subset of all data items having a tag of "fruit" are displayed in a 5 by 4 grid 64 on a left section of display 60. In a preliminary step, a new 35 dimensional descriptor space appropriate to the search subset is computed using single value decomposition (SVD) from the descriptor table restricted to the search subset. The 35 dimensions are reduced to 10 by selecting the 10 first dimensions, which are the largest contributors to the variance of the 35 descriptors for the search subset, and are therefore a good start to identity categories adapted to the search subset. The 20 categories are then defined as sectors in the reduced 10 dimensional descriptor space. The output of the SVD algorithm is scaled so that an origin of the descriptor space near the centre of the search subset so that the descriptor coordinates of the search subset have positive and negative values. A simple way of achieving this is to define each coordinate dimension relative to a roughly calculated centre by subtracting the average of the maximum and minimum values of that dimension in the search subset. This allows definition of the sectors as regions where one coordinate is greater in a positive or negative direction than the other coordinates yielding two sectors per dimension.

In terms of mathematical symbols, the positive sector of points $x \equiv (x_1, x_2 \ldots x_n)$ for the kth dimension of an n-dimensional descriptor space (e.g. of the new reduced 10 dimensional space) is defined by $$S^+_k = \{\text{all points } x \text{ such that } x_k > x_i \text{ and } |x_k| \geq |x_i| \text{ for all } i \neq k\}$$

and the negative sector is defined by $$S^-_k = \{\text{all points } x \text{ such that } x_k \leq x_i \text{ and } |x_k| \geq |x_i| \text{ for all } i \neq k\}$$

This way of defining sectors runs efficiently on a standard database via the use of a B+ tree.

Example of Identifying Representatives of Data Categories

For the categories found in the above example, a representative data item can be identified for each category by a variety of methods. An example of a rapidly executing method on a standard database is to identity the maximum and minimum values. In other words, the representative for the positive sector for the kth dimension is defined by the data item in sector $S^+_k$ with the largest (most positive) $x_k$, and the representative for the negative sector for the kth dimension is defined by the data item in sector $S^-_k$ with the lowest (most negative) $x_k$.

Example of Displaying the Representatives

For the image example detailed in this specification, display of the representatives can be conveniently ordered by placing the representatives for $S^+_k$ and $S^-_k$ at opposing positions on the display grid for example, $S^+_k$ and $S^-_1$ are placed in the top left (row 1, column 1) and bottom right (5, 4) positions, and $S^+_1$ and $S^-_2$ are placed in adjacent opposing positions (2,1) and (4,4) and so on.

As seen in FIGS. 5 and 6, as the search set is refined to include progressively fewer data items, the number of representatives reduces, due to some sectors being empty. Display of the reduced number of images may be accomplished by increasing the image size of each representative as shown in FIG. 5 and providing irregular divisions as shown is FIG. 6 for prime numbers of representatives that cannot be neatly placed in a grid.

Example of Audio Descriptor Space

The figures show an example of an image database, but the invention is equally applicable to audio data such as music.

Examples of audio descriptors that can be used in the invention include Mel-Frequency Cepstrum, Zero-Crossings, Spectral Analysis, Spectral Centroid, Spectral Rolloff, Linear Predictive Coding Coefficients, and Beat Histograms.

The inventors' currently implemented embodiment for music and audio data items uses, for the multidimensional descriptor space, a combination of a large variety of the known audio descriptors, such as are implemented on jAudio descriptor computation software [Ref 3], found on the internet at http://jmir.sourceforge.net/jAudio.html. A large number of available descriptors (in this case 330) are first tested on the data set to remove any (typically about 30) that tend to cause errors in the SVD algorithm for certain data types. The robust remaining set (about 300) is then subjected to the SVD algorithm as in the image example to provide a set of 35 descriptors to be stored in descriptor table 422. Computation of 10-dimensional and lower descriptor spaces in the course of the search proceed as described above.

Example of Audio Display

In the case of photographs, the nature of the item is apparent to the user in the display of the item. Clearly in the case of audio, adaptations are desirable in representative display controller 321 in the display of the audio items to convey some information on the nature of the audio, usually in addition to visual aspects such as the supplied music track artwork or album cover. One approach is to condense the descriptor coordinates further from 35 to 3 using SVD, and to represent the 3 condensed coordinates as RGB values in a colour space. The user will came to understand which colours correspond to which type of sounds.

Tag-Based Descriptor Applications

Although in the above examples the database is built from descriptors that are calculated from the native audiovisual data, such as colour balance or edge information for images and time series descriptors in the case of music, it is possible to include search terms in the original descriptor set, which can also be condensed together with the native descriptors in the SVD algorithm.

Depending on the database and application there may also be situations where the set of descriptors in the descriptor table 422 is calculated entirely from content-based descriptors. For example, when searching for a movie or more especially a book it may be found that information such as actors, director, author, plot, violence level etc is more useful in providing recommendations to the user than the native descriptors. There may also be a wide range of binary descriptors such as, in the case of video games, whether the game has action or strategy elements, puzzles, elves or guns. These content tags can all be treated the same way as the native disrupters and reduced to a multidimensional set of a manageable number of continuous coordinates using an algorithm such as SVD.

It will be appreciated that while single value decomposition from a large number of descriptors has been described as one method of calculating a manageable descriptor space for the descriptor table 422 and the multidimensional descriptor space of reduced dimensionality for the initial search subset and refined search subsets, the invention encompasses any way of categorizing and identifying representatives however produced. In particular, another clustering algorithm such as NIPALS could be used instead of SVD. Furthermore, the descriptor space is not restricted to Cartesian spaces, and may for example be a tree of nodes, the coordinates being any way of representing position in the tree, or any other structure. Further, although an automatic classification adapting to the contents of the search subsets is exemplified, the invention in its broadest form encompasses rigid non-adaptive categorizations also.

In the claims and the description, the term "initial search subset" extends to any search subset which precedes and is refined to the "refined search subset", and is not required to be an absolutely first search subset specified by the user in a searching session.

Persons skilled in the art will also appreciate that many other variations may be made to the invention without departing from the scope of the invention.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

REFERENCES

1. S. A. Chatzichristofis and Y. S. Boutalis, "CEDD: COLOR AND EDGE DIRECTIVITY DESCRIPTOR—A COMPACT DESCRIPTOR FOR IMAGE INDEXING AND RETRIEVAL.", <<6th International Conference in advanced research on Computer Vision Systems ICVS 2008>>Proceedings: Lecture Notes in Computer Science (LNCS) pp. 312-322, May 12 to May 15, 2008, Santorini, Greece
2. S. A. Chatzichristofis and Y. S. Boutalis, "FCTH: FUZZY COLOR AND TEXTURE HISTOGRAM—A LOW LEVEL FEATURE FOR ACCURATE IMAGE RETRIEVAL", <<9th International Workshop on Image Analysis for Multimedia Interactive Services", Proceedings: IEEE Computer Society pp. 191-196, May 7 to May 9, 2008, Klagenfurt, Austria
3. McEnnis, D., C. McKay, I. Fujinaga, and P. Depalle. 2005. jAudio: A feature extraction library *Proceedings of the International Conference on Music Information Retrieval*. 600-3.

The invention claimed is:

1. A method of searching a database containing data items with a user via a user interface wherein the user interface comprising a left pane and a right pane, the method comprising the steps of:
    specifying an initial search subset of some or all of the data items in the database;
    identifying representatives of each of a number data categories in the initial search subset, the number of categories being chosen so that all the initial search subset representatives can be displayed to the user at once;
    displaying the initial search subset representatives in the left pane on the user interface;
    selecting one or more of the displayed initial search subset representatives;
    specifying a refined search subset of data items in the initial search subset within the data categories corresponding to the representatives selected;
    identifying representatives of each of a number data categories in the refined search subset, the number of categories being chosen so that all the refined search subset representatives can be displayed to the user at once;
    displaying the refined search subset representatives on the user interface, wherein plural refined search subset representatives items are displayed (i) in the right pane and to one side of the initial search subset representatives, and (ii) at a larger size than the initial search subset representatives;
    selecting one or more of the displayed refined search subset representatives;
    specifying a further refined search subset of data items in the refined search subset within the data categories corresponding to the refined search subset representatives selected;
    identifying representatives of each of a number data categories in the further refined search subset, the number of further refined search subset categories being chosen so that all the further refined search subset representatives can be displayed to the user at once;
    displaying the refined search subset representative in the left pane of the user interface;

displaying the further refined search subset representatives on the user interface, wherein plural further refined search subset representatives are displayed (i) in the right pane and to one side of the refined search subset representatives simultaneously, and (ii) at a larger size than the refined search subset representatives.

2. The method as claimed in claim 1, wherein the step of specifying an initial search subset comprises receiving a restriction criterion from the user and defining the initial subset as data items satisfying the restriction criterion.

3. The method as claimed in claim 2, further comprising the step of using the restriction criterion as a value of a search term.

4. The method as claimed in claim 1, further comprising the steps of:
   associating the data items with descriptor values in a multidimensional descriptor space; and
   using sectors in the descriptor space as the data categories in the initial search subset.

5. The method as claimed in claim 4, further comprising the step of defining the multidimensional descriptor space having regard to obtaining categories adapted to the initial search subset.

6. The method as claimed in claim 5, further comprising the step of defining the multidimensional descriptor space from a descriptor table of stored values in a descriptor space of larger dimensionality by an algorithm that identifies a set of appropriate descriptors with reduced dimensionality for the initial search subset.

7. The method as claimed in claim 6, further comprising the step of choosing the reduced dimensionality having regard to the number of categories.

8. The method as claimed in claim 7, wherein an origin of the descriptor space is near a center of the search subset so that descriptor coordinates of the search subset have positive and negative values; and at least one of the categories is a sector in the multidimensional descriptor space that is greater in a positive or negative direction in one dimension compared to other dimensions in the multidimensional descriptor space.

9. The method as claimed in claim 8,
   when the sector is greater in a positive direction in one dimension of the multidimensional descriptor space, then further comprising the step of defining the sector by points with coordinate values in the one dimension that are greater in signed value and greater in absolute value than coordinate values in all other dimensions in the multidimensional descriptor space; and
   when the sector is greater in a negative direction in the one dimension of the multidimensional descriptor space, then further comprising the step of defining the sector with coordinate values in the one dimension that are lesser in signed value and greater in absolute value than coordinate values in the other dimensions in the multidimensional descriptor space.

10. The method as claimed in claim 8, wherein the representative of the sector corresponding to greater values in the positive direction in the one dimension is a data item in the search subset with the greatest signed coordinate value in the one dimension; and the representative of the sector corresponding to greater values in the negative direction in the one dimension is a data item in the search subset with the least signed coordinate value in the one dimension.

11. The method as claimed in claim 1, wherein the data items comprise digital media.

12. A non-transitory computer readable medium comprising computer program code which when executed by a computer causes the computer to implement the method as claimed in claim 1.

13. The method as claimed in claim 1, wherein the displaying step includes the step of displaying plural representative categories, each representative category displaying (i) a representative image and (ii) a numeric figure corresponding to a number of images within said each representative category.

14. The method as claimed in claim 13, wherein at least one step of displaying the refined search subset includes the step of displaying plural representative images non-symmetrically.

15. The method as claimed in claim 1, wherein a repeated displaying step includes the step of displaying on the user interface (i) the plurality of representatives of the initial search subset on one side of the user interface, and (ii) a plurality of representatives of the refined search subset on another side of the user interface, at least one of the plurality of representatives of the refined search subset being displayed in a zoom size larger than any of the plurality of representatives of the initial search subset.

16. A database searching system for interactively searching a database containing data items with a user, the database searching system comprising
   a user interface comprising a left pane and a right pane with a display;
   a search subset specifier for specifying an initial search subset of some or all of the data items in the database;
   a representative identifier for identifying representatives of each of a number of data categories in the initial search subset, the number of categories being chosen so that all the initial search subset representatives can be displayed to the user at once;
   a representative display controller for displaying the initial search subset representatives in the left pane on the display;
   a representative selector for selecting one or more of the initial search subset representatives;
   the search subset specifier for specifying a refined search subset of data items within the data categories corresponding to the selected representatives, wherein the representative display controller causes the user interface to display plural representatives of the initial search subset in the left pane beside plural representatives of the refined search subset are in the right pane, where the displayed plural refined search subset representatives are fewer in number and larger in size that the displayed initial search subset representatives; and
   the representative selector for further selecting one or more of the refined search subset representatives;
   the search subset specifier for specifying a further refined search subset of data items within the data categories corresponding to the further selected representatives, wherein the representative display controller causes the user interface to display plural representatives of the further refined search subset in the right pane beside plural representatives of the refined search subset in the left pane simutaneously, where the displayed plural further refined search subset representatives are fewer in number and larger in size that the displayed refined search subset representatives; and
   a repeater for repeating the specifying, identifying, displaying, and selecting until a last-refined search subset has no more than one member.

17. The database searching system as claimed in claim 16, further comprising a processor; and wherein at least one of the search subset specifier, representative identifier, representative display controller, representative selector, and repeater is implemented at least in part, by the processor executing code stored in non-transitory memory.

18. A database searching controller for interactively searching a database containing data items with a user via a user interface comprising a left pane and a right pane having a display, the database searching controller comprising
   a processor;
   an initial search subset specifier for specifying an initial search subset of some or all of the data items in the database;
   a representative identifier for identifying representatives of each of a number of data categories in the initial search subset, the number of categories being chosen so that all the representatives of the initial search subset can be displayed to the user at once;
   a representative display controller for displaying the representatives of the initial search subset in the left pane on the display;
   a representative selector for selecting one or more of the representatives;
   a refined search subset specifier for specifying a refined search subset of data items in the initial search subset within the data categories corresponding to the selected representatives; and
   a repeater for repeating the steps of identifying and displaying representatives for the refined search subset, wherein at least one of the initial search subset specifier, representative identifier, representative display controller, representative selector, refined search subset specifier, and repeater is implemented at least in part by the processor executing code stored in non-transitory memory, wherein the repeater repeats the identifying and displaying of representatives for the refined search subset, and wherein the repeater causes (i) the initial search subset representatives to be displayed in the left pane and on one side of the displayed refined search subset representatives wherein the refined search subset representatives are displayed in the right pane simultaneously, and (ii) a further refined search subset representatives to be displayed in the right pane and the refined search subset representatives are displayed in the left pane simultaneously, the further refined search subset representatives being less in number than the refined search subset representatives, which is less in number than the initial search subset representatives.

19. A method of searching a database containing data items with a user via a user interface wherein the user interface comprising a left pane and a right pane, the method comprising the steps of:
   specifying an initial search subset of some or all of the data items in the database;
   identifying representatives of each of a number of data categories in the initial search subset, the number of categories being chosen so that all the representatives can be displayed to the user at once;
   displaying the representatives of the initial search subset in the left pane on the user interface;
   selecting one or more of the displayed representatives;
   specifying a refined search subset of data items in the initial search subset within the data categories corresponding to the representatives selected; and
   repeating the steps of identifying and displaying representatives for the refined search subset, wherein the repeating step includes at least one step of displaying on the same display (i) plural images of the initial search subset in the left pane and plural images of the refined search subset in the right pane simultaneously, and (ii) plural images of a further refined search subset in the right pane and the plural images of the refined search subset in the left pane simultaneously, the displayed further refined search subset images being larger in size but fewer in number than the displayed refined search subset images, which are larger in size but fewer in number than the displayed initial search subset images, at least one representative of the further refined search subset being displayed at a zoomed image size larger than an image size of a corresponding image of the refined search subset, and wherein the steps of specifying, identifying, displaying, and selecting are repeated until a last-refined search subset has no more than one member.

20. The method as claimed in claim 19, further comprising the step of repeating the steps of specifying, identifying, displaying and selecting to include progressively fewer data items and corresponding representatives.

21. The method as claimed in claim 20, further comprising the step of, as the number of representatives decreased, increasing the image size of each representative.

22. A method of searching a database containing data items with a user via a user interface wherein the user interface comprising a left pane and a right pane, the method comprising the steps of:
   specifying an initial search subset of some or all of the data items in the database;
   identifying representatives of each of a number data categories in the initial search subset, the number of categories being chosen so that all the representatives can be displayed to the user at once;
   displaying the representatives of the initial search subset in the left pane on the user interface;
   selecting one or more of the displayed representatives;
   specifying a refined search subset of data items in the initial search subset within the data categories corresponding to the representatives selected;
   repeating the steps of identifying and displaying representatives for the refined search subset, wherein the refined search subset items are displayed (i) in the right pane and the initial search subset representatives are in the left pane simultaneously, and (ii) at a larger size than the initial search subset representatives;
   wherein the database includes a descriptor space table having multi-dimensional values corresponding to each representative, and wherein the repeated step of identifying refined search subset representatives includes the step of computing a new reduced-multi-dimensional descriptor space from the descriptor space table, the new reduced-multi-dimensional descriptor space having a table restricted to the refined search subset, and
   wherein the repeated step of identifying refined search subset representatives includes the steps of:
   determining an origin of the descriptor space near a center of the refined search subset so that descriptor coordinates of the refined search subset have positive and negative values;
   defining each coordinate dimension relative to a calculated center by subtracting the average of the maximum and minimum values of that dimension in the refined search subset,
   wherein positive value points $x \equiv (x_1, x_2, \ldots x_n)$ for the $k^{th}$ dimension of the reduced-multi-dimensional descriptor space is defined by:
   $S^+_k = \{$all points x such that $x_k > x_i$ and $|x_k| > |x_i|$ for all $i \neq k\}$; and the negative value points $x \equiv (x_1, X_2, \ldots, x_n)$ for the $k^{th}$ dimension of the reduced-multi-dimensional descriptor space is defined by:

$S^-_k = \{$all points x such that $x_k \leq x_i$ and $|x_k| \geq x_i|$ for all $i \neq k\}$.

* * * * *